United States Patent
Ohsumi (10) Patent No.: US 10,920,701 B2
(45) Date of Patent: Feb. 16, 2021

(54) FILTER REGENERATION SYSTEM FOR INTERNAL COMBUSTION ENGINE AND FILTER REGENERATION METHOD FOR INTERNAL COMBUSTION ENGINE

(71) Applicant: ISUZU MOTORS LIMITED, Tokyo (JP)

(72) Inventor: Kazuo Ohsumi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 150 days.

(21) Appl. No.: 16/306,880

(22) PCT Filed: May 31, 2017

(86) PCT No.: PCT/JP2017/020282
§ 371 (c)(1),
(2) Date: Dec. 3, 2018

(87) PCT Pub. No.: WO2017/209186
PCT Pub. Date: Dec. 7, 2017

(65) Prior Publication Data
US 2020/0116096 A1      Apr. 16, 2020

(30) Foreign Application Priority Data

Jun. 3, 2016   (JP) .............................. JP2016-111459

(51) Int. Cl.
*F02D 41/14*     (2006.01)
*F01N 3/023*     (2006.01)

(52) U.S. Cl.
CPC ......... *F02D 41/1458* (2013.01); *F01N 3/023* (2013.01); *F01N 2900/1606* (2013.01)

(58) Field of Classification Search
CPC ...... F02D 41/1458; F01N 3/023; F01N 3/021; F01N 3/0231; F01N 3/035; F01N 2560/016; F01N 2900/1606; F01N 9/002
See application file for complete search history.

(56) References Cited

U.S. PATENT DOCUMENTS 7,980,065 B2 *   7/2011   Heibel .................... F01N 3/021
                                                        60/295
8,161,737 B2 *   4/2012   Kanaya .................. F01N 9/002
                                                        60/295

(Continued)

FOREIGN PATENT DOCUMENTS

DE     102009005733 A1    7/2010
EP         2670958 A1    12/2013

(Continued)

OTHER PUBLICATIONS

International Search Report and Written Opinion for related International Application No. PCT/JP2017/020282 filed on May 31, 2017, dated Jul. 4, 2017; English translation of ISR provided; 9 pages.

(Continued)

*Primary Examiner* — Michael J Zanelli
(74) *Attorney, Agent, or Firm* — Procopio, Cory, Hargreaves & Savitch LLP (57) ABSTRACT

A filter regeneration system for an internal combustion engine, the filter regeneration system including: a calculation unit configured to calculate a minimum oxygen concentration and a minimum nitrogen dioxide concentration at which a passive regeneration reaction, in which carbon in PM accumulated on a filter arranged in an exhaust gas passage of the internal combustion engine reacts with nitrogen dioxide and oxygen to generate carbon dioxide and nitrogen monoxide, occurs based on an amount of the PM accumulated on the filter; and an exhaust gas temperature (Continued)

control unit configured to, in a case where an oxygen concentration and a nitrogen dioxide concentration in exhaust gas on an upstream of the filter are equal to or higher than the minimum oxygen concentration and the minimum nitrogen dioxide concentration, respectively, control a temperature of exhaust gas flowing into the filter within a temperature range in which the passive regeneration reaction occurs preferentially.

4 Claims, 6 Drawing Sheets

(56) References Cited

U.S. PATENT DOCUMENTS

| | | | |
|---|---|---|---|
| 8,191,413 B2* | 6/2012 | Lahr | G01N 33/0024 |
| | | | 73/114.71 |
| 2008/0276604 A1 | 11/2008 | Hosaka | |
| 2010/0186377 A1* | 7/2010 | Shibata | F01N 3/0842 |
| | | | 60/275 |
| 2010/0269490 A1 | 10/2010 | Kanaya et al. | |
| 2010/0326055 A1 | 12/2010 | Huber et al. | |
| 2011/0000190 A1 | 1/2011 | Svensson et al. | |
| 2011/0232363 A1 | 9/2011 | Schoemig et al. | |
| 2011/0289903 A1 | 12/2011 | Dring | |
| 2012/0053814 A1 | 3/2012 | George et al. | |
| 2014/0216017 A1 | 8/2014 | Shirai | |
| 2015/0068195 A1 | 3/2015 | Lauer et al. | |
| 2015/0275722 A1 | 10/2015 | Doering | |
| 2015/0369154 A1* | 12/2015 | Garombo | F02D 41/1446 |
| | | | 60/274 |

FOREIGN PATENT DOCUMENTS

| | | | |
|---|---|---|---|
| JP | 2001-234732 A | | 8/2001 |
| JP | 2008-274896 A | | 11/2008 |
| JP | 2009-108809 A | | 5/2009 |
| JP | 2010-144565 | * | 7/2010 |
| JP | 2010261390 A | | 11/2010 |
| JP | 2013170450 A | | 9/2013 |
| JP | 2014-507592 A | | 3/2014 |
| JP | 2015-017516 A | | 1/2015 |
| JP | 2013-221419 A | | 10/2015 |
| JP | 2015-200320 A | | 11/2015 |
| WO | 2012-105890 A1 | | 8/2012 |
| WO | 2013-076867 A1 | | 5/2013 |

OTHER PUBLICATIONS

Extended European Search Report for related EP App No. 17806737.7 dated Mar. 26, 2019, 7 pgs.

Office Action for related JP App. No. 2016111459 dated May 19, 2020. English translation provided; 4 pages.

* cited by examiner

FILTER REGENERATION SYSTEM FOR INTERNAL COMBUSTION ENGINE AND FILTER REGENERATION METHOD FOR INTERNAL COMBUSTION ENGINE

CROSS-REFERENCE TO RELATED APPLICATIONS

This application is a U.S. National Stage entry of PCT Application No: PCT/JP2017/020282 filed on May 31, 2017, which claims priority to Japanese Patent Application No. 2016-111459, filed Jun. 3, 2016, the contents of which are incorporated herein by reference.

TECHNICAL FIELD

The present disclosure relates to a filter regeneration system for an internal combustion engine and a filter regeneration method for an internal combustion engine.

BACKGROUND ART

In related art, there is known an internal combustion engine system including, in an exhaust gas passage thereof, a filter that collects PM such as soot contained in exhaust gas of an internal combustion engine. Further, in the related art, in such an internal combustion engine system, filter regeneration processing of removing PM using an active regeneration reaction or a passive regeneration reaction is known as filter regeneration processing of removing PM accumulated on a filter (for example, refer to Patent Document 1 and Patent Document 2).

Specifically, Patent Document 1 and Patent Document 2 disclose, as filter regeneration processing using an active regeneration reaction, a technology of removing PM from a filter by a chemical reaction (referred to as a $C-O_2$ reaction) in which carbon monoxide and carbon dioxide are generated by reacting carbon of PM accumulated on the filter with oxygen. Further, as filter regeneration processing using a passive regeneration reaction, a technology of removing PM from a filter by a chemical reaction (referred to as a $C-NO_2$ reaction) in which nitrogen monoxide and carbon monoxide or carbon dioxide are generated by reacting carbon of PM accumulated on the filter with nitrogen dioxide is disclosed.

PRIOR ART DOCUMENT

Patent Document

Patent Document 1: JP-A-2015-200320
Patent Document 2: JP-T-2014-507592

SUMMARY OF THE INVENTION

Problems to be Solved by the Invention

Incidentally, there is filter regeneration processing using the passive regeneration reaction of removing PM from the filter by a chemical reaction (referred to as a $C-NO_2-O_2$ reaction) in which carbon dioxide and nitrogen monoxide are generated by reacting carbon of PM accumulated on the filter with nitrogen dioxide and oxygen in addition to the filter regeneration processing using the $C-NO_2$ reaction described above. The passive regeneration reaction occurs in preference to the active regeneration reaction at low temperature, and in the passive regeneration reaction, the $C-NO_2-O_2$ reaction has a higher reaction speed than the $C-NO_2$ reaction at low temperature. Therefore, in order to efficiently remove the PM accumulated on the filter, it is effective to use the passive regeneration reaction of the $C-NO_2-O_2$ reaction.

However, in the related art, the PM accumulated on the filter cannot be efficiently removed by the passive regeneration reaction of the $C-NO_2-O_2$ reaction.

The present disclosure has been made in view of the above, and an object thereof is to provide a filter regeneration system for an internal combustion engine and a filter regeneration method for an internal combustion engine, in which PM accumulated on a filter of the internal combustion engine can be efficiently removed by a passive regeneration reaction of a $C-NO_2-O_2$ reaction.

Means for Solving the Problems

In order to achieve the above object, a filter regeneration system for an internal combustion engine according to the present disclosure includes: a calculation unit configured to calculate a minimum oxygen concentration and a minimum nitrogen dioxide concentration at which a passive regeneration reaction, in which carbon in PM (Particulate Matter) accumulated on a filter arranged in an exhaust gas passage of the internal combustion engine reacts with nitrogen dioxide and oxygen to generate carbon dioxide and nitrogen monoxide, occurs based on an amount of the PM accumulated on the filter; and an exhaust gas temperature control unit configured to, in a case where an oxygen concentration and a nitrogen dioxide concentration in exhaust gas on an upstream of the filter are equal to or higher than the minimum oxygen concentration and the minimum nitrogen dioxide concentration, respectively, control a temperature of exhaust gas flowing into the filter within a temperature range in which the passive regeneration reaction occurs preferentially.

In addition, in order to achieve the above object, a filter regeneration method for an internal combustion engine according to the present disclosure includes: a step of calculating a minimum oxygen concentration and a minimum nitrogen dioxide concentration at which a passive regeneration reaction, in which carbon in PM (Particulate Matter) accumulated on a filter arranged in an exhaust gas passage of the internal combustion engine reacts with nitrogen dioxide and oxygen to generate carbon dioxide and nitrogen monoxide, occurs based on an amount of the PM accumulated on the filter; and a step of, in a case where an oxygen concentration and a nitrogen dioxide concentration in exhaust gas on an upstream of the filter are equal to or higher than the minimum oxygen concentration and the minimum nitrogen dioxide concentration, respectively, controlling a temperature of exhaust gas flowing into the filter within a temperature range in which the passive regeneration reaction occurs preferentially.

Effect of the Invention

According to the filter regeneration system for an internal combustion engine and the filter regeneration method for an internal combustion engine according to the present disclosure, in a case where the oxygen concentration and the nitrogen dioxide concentration in the exhaust gas on the upstream side of the filter are respectively equal to or higher than the minimum oxygen concentration and the minimum nitrogen dioxide concentration at which the passive regeneration reaction of the $C-NO_2-O_2$ reaction occurs, the minimum oxygen concentration and the minimum nitrogen dioxide concentration being calculated based on the amount of the PM accumulated on the filter, the temperature of the exhaust gas flowing into the filter can be controlled within a temperature range in which the passive regeneration reaction of the C—$NO_2$—$O_2$ reaction occurs preferentially. Accordingly, the PM accumulated on the filter can be reliably removed by the passive regeneration reaction of the C—$NO_2$—$O_2$ reaction without performing wasteful control such as raising the temperature of the exhaust gas flowing into the filter, even though the oxygen concentration or the nitrogen dioxide concentration in the exhaust gas on the upstream side of the filter is not a concentration at which the passive regeneration reaction of the C—$NO_2$—$O_2$ reaction occurs, for example. Therefore, the PM accumulated on the filter can be efficiently removed by the passive regeneration reaction of the C—$NO_2$—$O_2$ reaction.

Incidentally, according to the present disclosure, since the PM accumulated on the filter can be efficiently removed by the passive regeneration reaction of the C—$NO_2$—$O_2$ reaction described above, it is possible to reduce execution frequency of the filter regeneration processing using the active regeneration reaction. Thus, the fuel consumption of the internal combustion engine can also be reduced.

DESCRIPTION OF EMBODIMENTS

Figure 1:
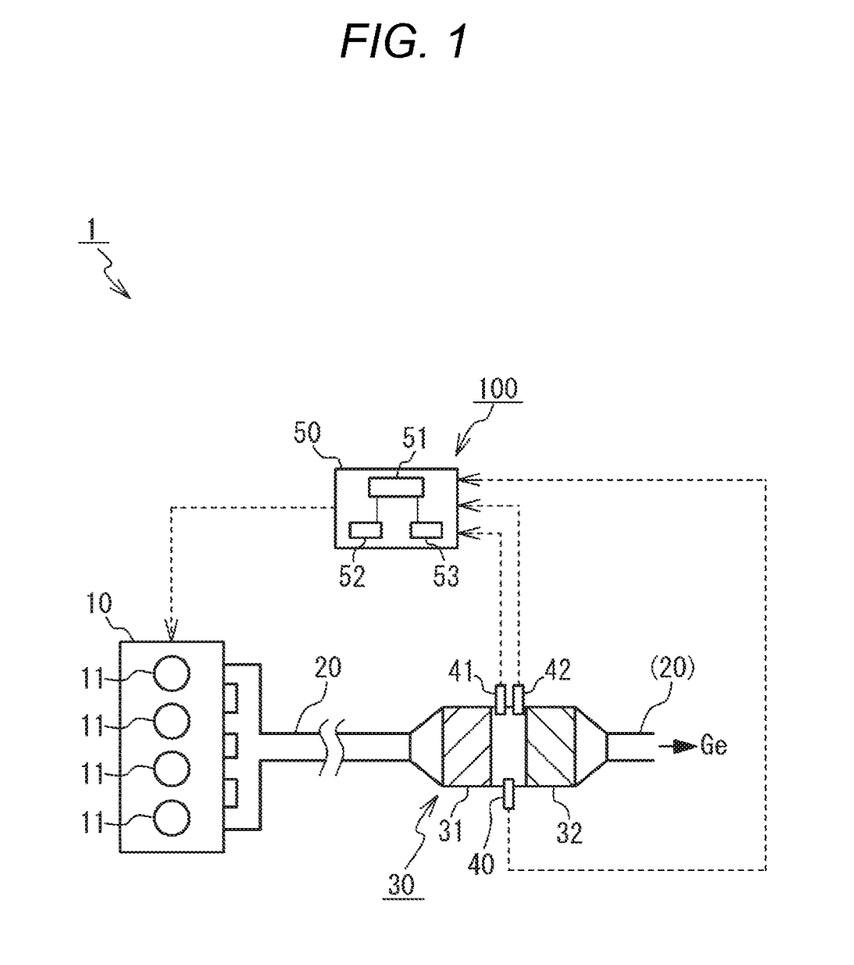
FIG. 1 is a schematic diagram illustrating a configuration of an internal combustion engine system according to an embodiment.

Hereinafter, a filter regeneration system 100 for an internal combustion engine and a filter regeneration method for an internal combustion engine according to an embodiment of the present disclosure will be described with reference to the drawings. FIG. 1 is a schematic diagram illustrating a configuration of an internal combustion engine system 1 in which a filter regeneration system 100 for an internal combustion engine (hereinafter, abbreviated as filter regeneration system 100) according to the embodiment is applied. The internal combustion engine system 1 in FIG. 1 is mounted on a vehicle. The internal combustion engine system 1 includes an internal combustion engine 10, an exhaust gas passage 20, an exhaust gas purification device 30, various sensors (temperature sensor 40, oxygen concentration sensor 41, and nitrogen dioxide concentration sensor 42 are exemplified), and a control device 50. This will be described later, and the filter regeneration system 100 according to the embodiment is realized by a function of a control device 50.

The type of the internal combustion engine 10 is not particularly limited, but a diesel engine is used as an example in the embodiment. The exhaust gas passage 20 is a passage through which exhaust gas (Ge) discharged from cylinders 11 of the internal combustion engine 10 passes. An upstream side end portion of the exhaust gas passage 20 branches to communicate with exhaust gas ports of the cylinders 11 of the internal combustion engine 10.

The exhaust gas purification device 30 is arranged in the exhaust gas passage 20. The exhaust gas purification device 30 includes a filter 32 that collects PM (Particulate Matter; particulate matter) such as soot contained in the exhaust gas. In the embodiment, a diesel particulate filter (DPF) is used as an example of the filter 32.

Although a specific configuration of the exhaust gas purification device 30 is not particularly limited as long as the exhaust gas purification device 30 includes the filter 32, the exhaust gas purification device 30 according to the embodiment further includes an oxidation catalyst 31 in the exhaust gas passage 20 on an upstream side of the filter 32. The oxidation catalyst 31 has a configuration in which a noble metal catalyst such as platinum (Pt) or palladium (Pd) is carried on a filter through which exhaust gas can pass. The oxidation catalyst 31 promotes an oxidation reaction of changing nitrogen monoxide (NO) in the exhaust gas into nitrogen dioxide ($NO_2$) by an oxidation catalytic action of the noble metal catalyst.

The temperature sensor 40 detects a temperature of the exhaust gas and transmits the detection result to the control device 50. The temperature sensor 40 according to the embodiment detects a temperature of exhaust gas on the upstream side of the filter 32, more specifically, a temperature of exhaust gas on the upstream side of the filter 32 and on a downstream side of the oxidation catalyst 31. However, a detection place of the temperature sensor 40 is not limited thereto.

The oxygen concentration sensor 41 detects oxygen concentration in the exhaust gas on the upstream side of the filter 32, and transmits the detection result to the control device 50. The nitrogen dioxide concentration sensor 42 detects nitrogen dioxide concentration in the exhaust gas on the upstream side of the filter 32, and transmits the detection result to the control device 50. Specifically, the oxygen concentration sensor 41 and the nitrogen dioxide concentration sensor 42 according to the embodiment respectively detect the oxygen concentration and the nitrogen dioxide concentration in the exhaust gas in a portion on the upstream side of the filter 32 and the downstream side of the oxidation catalyst 31.

The control device 50 has a function as a control device that controls operation action of the internal combustion engine 10 by controlling a fuel injection amount and a fuel injection timing of the internal combustion engine 10. The control device 50 also has a function as a filter regeneration system 100 that regenerates the filter 32 by executing filter regeneration processing to be described later. Such a control device 50 includes a microcomputer including a CPU 51 that executes various types of control processing, and a ROM 52, a RAM 53, and the like having a function as a memory unit that memorizes various types of information used for action of the CPU 51.

Next, technical knowledge that triggered invention of the filter regeneration processing according to the embodiment will be described, and then details of the filter regeneration processing according to the embodiment will be described.

First, the above technical knowledge will be described. Examples of a chemical reaction for filter regeneration for removing PM accumulated on the filter 32 include the following three types of chemical reaction. A first chemical reaction is a chemical reaction (referred to as a C—$NO_2$—$O_2$ reaction) that reacts carbon (C) of the PM accumulated on the filter 32 with nitrogen dioxide ($NO_2$) and oxygen ($O_2$) to generate carbon dioxide ($CO_2$) and nitrogen monoxide (NO). A second chemical reaction is a chemical reaction (referred to as a C—$NO_2$ reaction) that reacts carbon of the PM accumulated on the filter 32 with nitrogen dioxide to generate nitrogen monoxide, carbon monoxide (CO) or carbon dioxide. A third chemical reaction is a chemical reaction (referred to as a C—$O_2$ reaction) that reacts carbon of the PM accumulated on the filter 32 with oxygen to generate carbon monoxide and carbon dioxide.

Among these chemical reactions, the C—$O_2$ reaction corresponds to an active regeneration reaction, and the C—$NO_2$—$O_2$ reaction and the C—$NO_2$ reaction correspond to a passive regeneration reaction.

Figure 2:
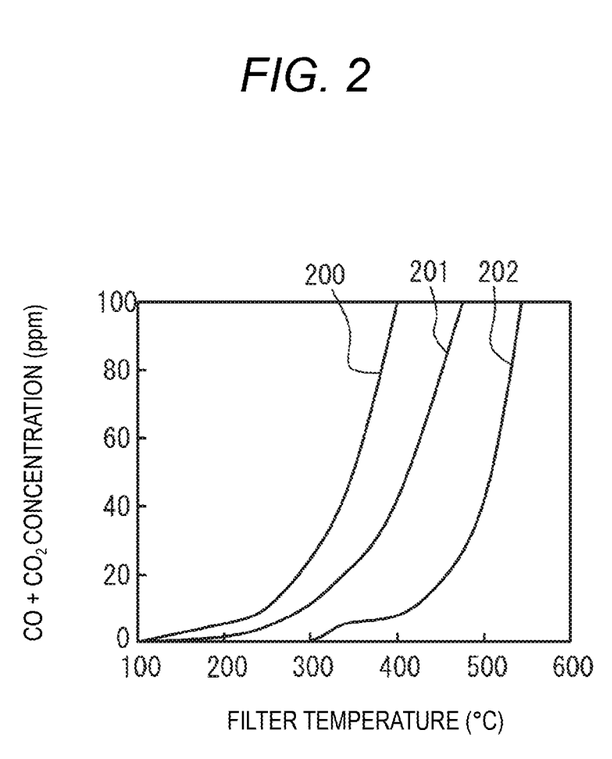
FIG. 2 is a graph for explaining temperature ranges in which a C—$NO_2$—$O_2$ reaction, a C—$NO_2$ reaction, and a C—$O_2$ reaction occur preferentially.

Temperature ranges within which the above-described C—$NO_2$—$O_2$ reaction, the C—$NO_2$ reaction, and the C—$O_2$ reaction occur preferentially are different from each other. FIG. 2 is a graph for explaining temperature ranges within which a C—$NO_2$—$O_2$ reaction, a C—$NO_2$ reaction, and a C—$O_2$ reaction occur preferentially. Specifically, a vertical axis in FIG. 2 indicates a total concentration of carbon monoxide and carbon dioxide generated by these reactions, and a horizontal axis indicates a temperature of the filter 32. It is indicated that the higher the vertical axis in FIG. 2 faces upward, the faster the combustion speed of PM is. A line 200 in FIG. 2 shows a total concentration of carbon monoxide and carbon dioxide generated by the C—$NO_2$—$O_2$ reaction (however, carbon dioxide actually generated in this case), a line 201 shows a total concentration of carbon monoxide and carbon dioxide generated by the C—$NO_2$ reaction, and a line 202 shows a total concentration of carbon monoxide and carbon dioxide generated by the C—$O_2$ reaction.

From FIG. 2, it is known that the C—$O_2$ reaction indicated by the line 202 occurs preferentially in a high-temperature region, and the C—$NO_2$ reaction indicated by the line 201 occurs preferentially in a medium-temperature region, and the C—$NO_2$—$O_2$ reaction indicated by the line 200 occurs preferentially in a low-temperature region (specifically, a temperature region of 250° C. or higher and 350° C. or lower). That is, in the low-temperature region, a reaction speed of the C—$NO_2$—$O_2$ reaction is the highest.

If the C—$NO_2$—$O_2$ reaction having a large reaction speed in the low-temperature region can be efficiently caused and the C—$NO_2$—$O_2$ reaction can be used, the PM accumulated on the filter 32 can be efficiently removed. Incidentally, in order to efficiently cause the C—$NO_2$—$O_2$ reaction, for example, it is conceivable to arrange the filter 32 at a position close to the internal combustion engine 10 so as to maintain a temperature of exhaust gas flowing into the filter 32 during operation of the internal combustion engine 10 within a temperature range where the C—$NO_2$—$O_2$ reaction preferentially occurs as much as possible. However, even if the filter 32 is arranged at a position close to the internal combustion engine 10, it is difficult to make the entire filter 32 within a temperature range where the C—$NO_2$—$O_2$ reaction preferentially occurs. Therefore, in this technique, the PM accumulated on the filter 32 cannot be efficiently removed.

Figure 3:
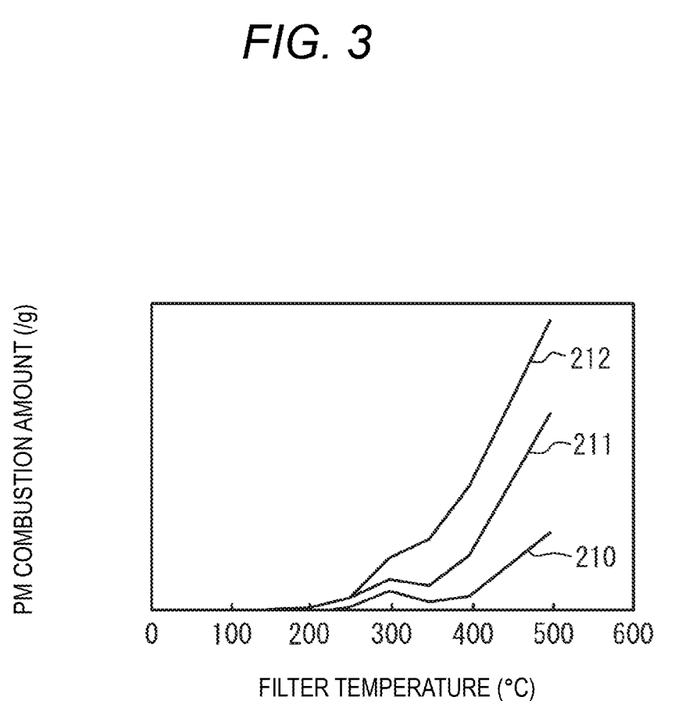
FIG. 3 is a graph for explaining a relationship between an amount of PM accumulated on a filter and a combustion speed of PM.

Therefore, the present inventors focus on an amount of the PM accumulated on the filter 32 and an oxygen concentration and a nitrogen dioxide concentration in exhaust gas that can combust the PM in the C—$NO_2$—$O_2$ reaction. FIG. 3 is a graph for explaining a relationship between the amount of the PM accumulated on the filter 32 and a combustion speed of the PM. Specifically, a vertical axis in FIG. 3 indicates a combustion amount of the PM accumulated on the filter 32 (specifically, a combustion amount of soot), and a horizontal axis indicates a temperature of the filter 32. A line 210, a line 211, and a line 212 indicate the combustion amount of the PM in cases where the amount of the PM accumulated on the filter 32 is $a_1$ (g/L), $a_2$ (g/L), and $a_3$ (g/L), respectively. Incidentally, $a_2$ is larger than $a_1$, and $a_3$ is larger than $a_2$.

As illustrated in FIG. 3, in the low-temperature region where at least the C—$NO_2$—$O_2$ reaction occurs preferentially, when compared at the same filter temperature, the combustion amount of the PM is larger in the line 211 than in the line 210, and the combustion amount of the PM is larger in the line 222 than in the line 211. Therefore, it is known that as the amount of the PM accumulated on the filter 32 increases, an amount of PM combusted in the C—$NO_2$—$O_2$ reaction increases, and as a result, the PM accumulated on the filter 32 can be efficiently removed by the passive regeneration reaction of the C—$NO_2$—$O_2$ reaction.

Figure 4:
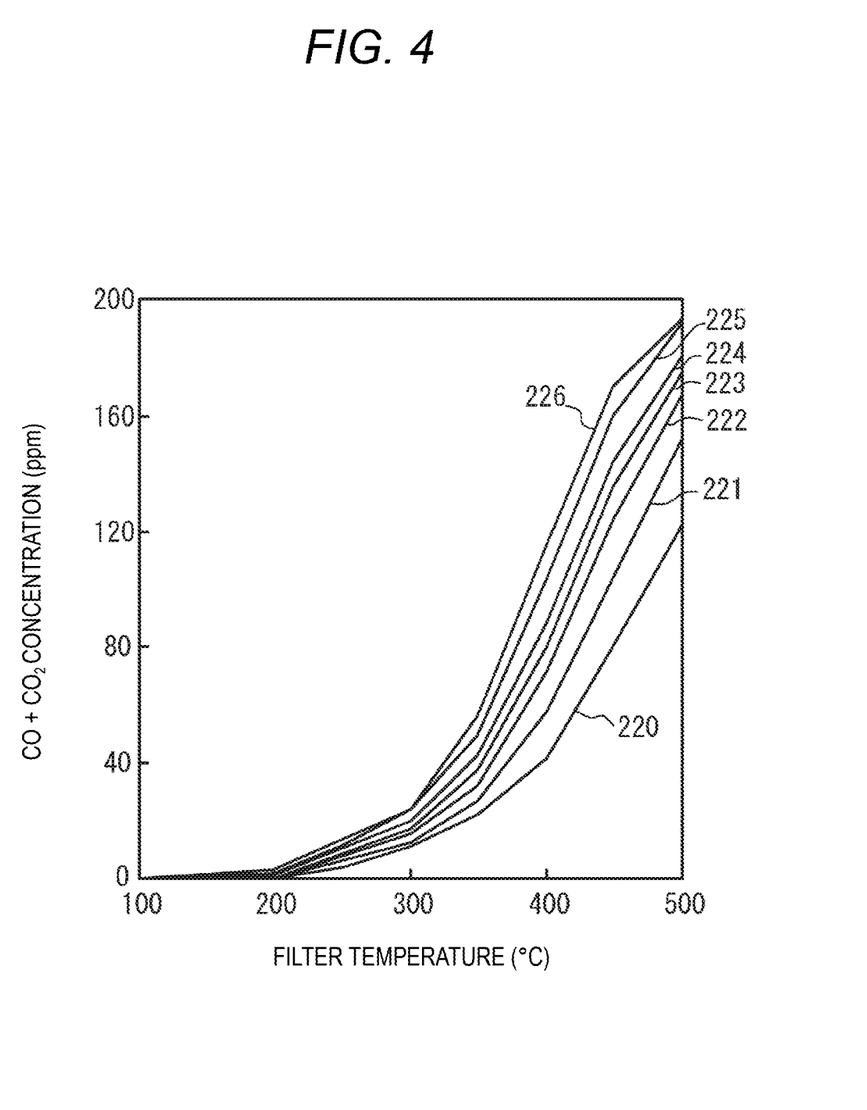
FIG. 4 is a graph for explaining a relationship between an oxygen concentration in combustion of PM and a combustion speed of PM.

FIG. 4 is a graph for explaining a relationship between an oxygen concentration and a combustion speed of PM in combustion of PM. Specifically, a vertical axis in FIG. 4 indicates a total concentration of carbon monoxide and carbon dioxide generated by combustion of PM, and a horizontal axis indicates a temperature of the filter 32. Under conditions where a nitrogen dioxide concentration in the exhaust gas is constant, a line 220, a line 221, and a line 222 respectively indicate cases where an oxygen concentration in the exhaust gas is $b_1$(%), $b_2$(%), and $b_3$(%), and under conditions where a nitrogen dioxide concentration in the exhaust gas is constant, a line 223, a line 224, a line 225, and a line 226 respectively indicate cases where the oxygen concentration in the exhaust gas is $b_4$(%), $b_5$(%), $b_6$(%), and $b_7$(%). A magnitude relationship of $b_1$ to $b_7$ is a relationship that $b_1 \ll b_3 < b_4 < b_5 < b_6 < b_7$.

As illustrated in FIG. 4, in a low-temperature region where at least a C—$NO_2$—$O_2$ reaction occurs preferentially, when compared at the same filter temperature and the same nitrogen dioxide concentration, as the oxygen concentration in the exhaust gas increases, the total concentration of carbon monoxide and carbon dioxide generated by combustion of PM increases. Therefore, it is known that as the oxygen concentration in the exhaust gas increases, the PM accumulated on the filter 32 can be efficiently removed by the passive regeneration reaction of the C—$NO_2$—$O_2$ reaction.

Figure 5:
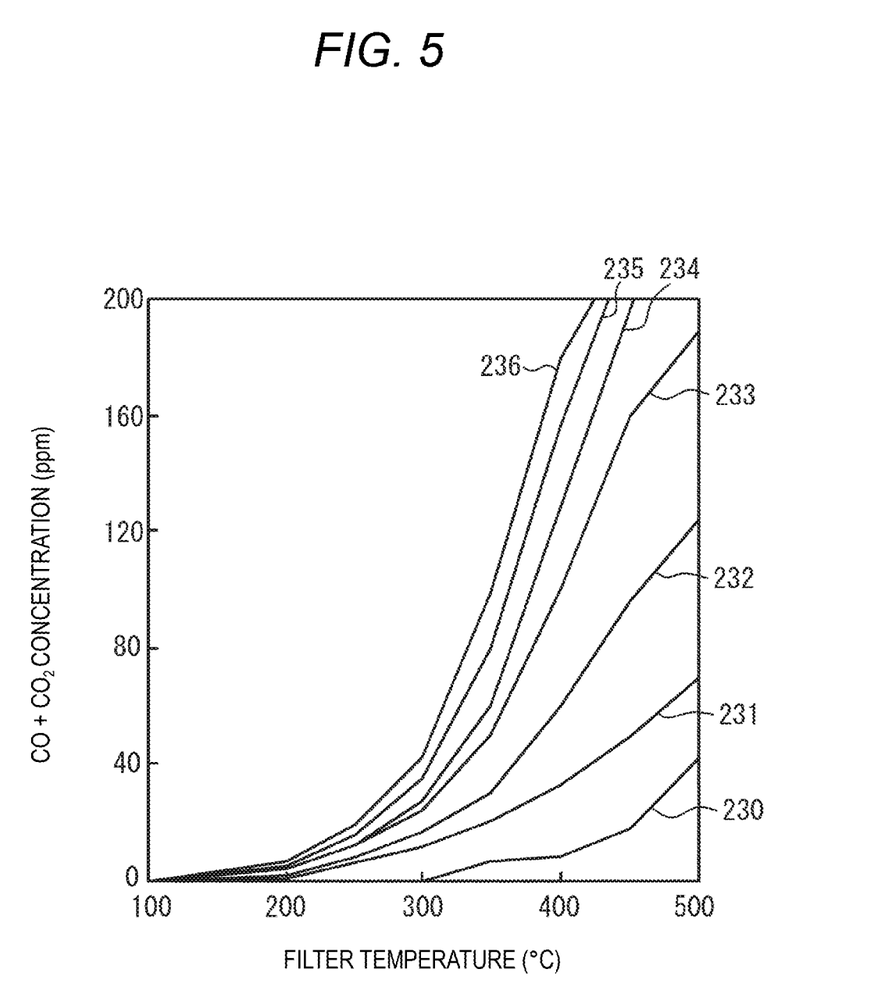
FIG. 5 is a graph for explaining a relationship between a nitrogen dioxide concentration in combustion of PM and a combustion speed of PM.

FIG. 5 is a graph for explaining a relationship between a nitrogen dioxide concentration and a combustion speed of PM in combustion of PM. Specifically, a vertical axis in FIG. 5 indicates a total concentration of carbon monoxide and carbon dioxide generated by combustion of PM, and a horizontal axis indicates a temperature of the filter 32. Under conditions where an oxygen concentration in the exhaust gas is constant, a line 230, a line 231, and a line 232 respectively indicate cases where a nitrogen dioxide concentration in the exhaust gas is $c_1$ (ppm), $c_2$ (ppm), and $c_3$ (ppm), and under conditions where an oxygen concentration in the exhaust gas is constant, a line 233, a line 234, a line 235, and a line 236 respectively indicate cases where the nitrogen dioxide concentration in the exhaust gas is $c_4$ (ppm), $c_5$ (ppm), $c_6$ (ppm), and $c_7$ (ppm). A magnitude relationship of $c_1$ to $c_7$ is a relationship that $c_1 < c_2 < c_3 < c_4 < c_5 < c_6 < c_7$.

As illustrated in FIG. 5, in a low-temperature region where at least a C—$NO_2$—$O_2$ reaction occurs preferentially, when compared at the same filter temperature and the same oxygen concentration, as the nitrogen dioxide concentration in the exhaust gas increases, the total concentration of carbon monoxide and carbon dioxide generated by combustion of PM increases. Therefore, it is known that as the nitrogen dioxide concentration in the exhaust gas increases, the PM accumulated on the filter 32 can be efficiently removed by the passive regeneration reaction of the $C-NO_2-O_2$ reaction.

From the above, it is known that in order to efficiently remove the PM accumulated on the filter 32 by the passive regeneration reaction of the $C-NO_2-O_2$ reaction, the oxygen concentration and the nitrogen dioxide concentration in the exhaust gas on at least the upstream side of the filter 32 need to be equal to or higher than the minimum oxygen concentration and the minimum nitrogen dioxide concentration at which the $C-NO_2-O_2$ reaction occurs, respectively, and as the oxygen concentration and the nitrogen dioxide concentration on the upstream side of the filter 32 increase separately, the PM accumulated on the filter 32 can be removed more efficiently by the passive regeneration reaction of the $C-NO_2-O_2$ reaction. The filter regeneration processing according to the embodiment has been invented based on the above technical knowledge.

Figure 6:
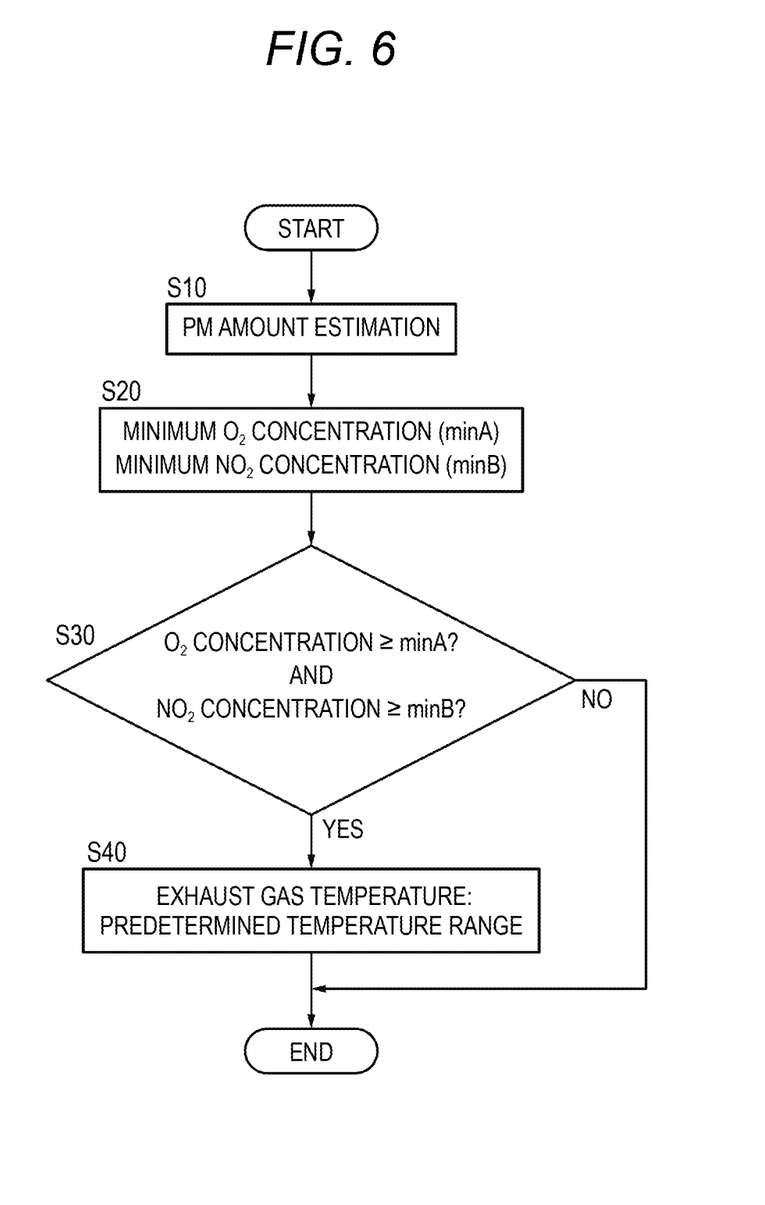
FIG. 6 is an example of a flowchart illustrating filter regeneration processing according to the embodiment.

Next, details of the filter regeneration processing according to the embodiment will be described. FIG. 6 is an example of a flowchart illustrating the filter regeneration processing according to the embodiment. The control device 50 repeatedly executes the flowchart of FIG. 6 at a predetermined cycle after start of the internal combustion engine 10. Each step in FIG. 6 is executed by specifically the CPU 51 of the control device 50. The filter regeneration method according to the embodiment is realized by the control device 50 that executes the FIG. 6.

First, in step S10, the control device 50 estimates an amount of the PM (PM amount) accumulated on the filter 32. A specific method of estimating the PM amount by the control device 50 is not particularly limited, and a well-known PM amount estimation method can be applied. As an example, the control device 50 according to the embodiment estimates the PM amount accumulated on the filter 32 based on differential pressure (upstream-downstream differential pressure) between exhaust gas pressure on the upstream side of the filter 32 and exhaust gas pressure on the downstream side of the filter 32.

Specifically, a map or an arithmetic expression defining a relationship between the upstream-downstream differential pressure of the filter 32 and the amount of the PM accumulated on the filter 32 is memorized in advance in the memory unit (for example, ROM 52) of the control device 50. The map or the arithmetic expression is defined such that a calculated value of the amount of the PM accumulated on the filter 32 increases as the upstream-downstream differential pressure increases. The internal combustion engine system 1 includes a differential pressure sensor (not illustrated) that detects the upstream-downstream differential pressure of the filter 32. Then, the control device 50 acquires the upstream-downstream differential pressure based on a detection result of the differential pressure sensor, calculates the PM amount corresponding to the acquired upstream-downstream differential pressure based on the map or the arithmetic expression of the memory unit, and acquires the calculated PM amount as a PM amount in step S10.

After step S10, the control device 50 calculates a minimum oxygen concentration (minA) and a minimum nitrogen dioxide concentration (minB) at which the passive regeneration reaction of the $C-NO_2-O_2$ reaction occurs based on the PM amount estimated in step S10 (step S20). Specifically, the control device 50 calculates a carbon amount (namely, a carbon concentration in the accumulated PM) contained in the PM accumulated on the filter 32 based on the PM amount estimated in step S10. Then, the control device 50 calculates the oxygen concentration and the nitrogen dioxide concentration in the exhaust gas in a lowest limit (namely, the minimum oxygen concentration and the minimum nitrogen dioxide concentration) necessary to combust carbon having the calculated carbon amount in the $C-NO_2-O_2$ reaction.

In step S20, when calculating the amount of carbon in the PM accumulated on the filter 32 based on the PM amount estimated in step S10, the control device 50 calculates the amount of carbon in the PM by using a predetermined map or arithmetic expression that associates and defines the PM amount and the amount of carbon in the PM. The predetermined map or arithmetic expression is defined such that the amount of carbon in the calculated PM increases as the estimated PM amount increases. The predetermined map or arithmetic expression is memorized in advance in the memory unit of the control device 50.

The $C-NO_2-O_2$ reaction can be represented by a chemical formula of the following formula (1). Therefore, in step S20, when calculating the minimum oxygen concentration and the minimum nitrogen dioxide concentration based on the calculated carbon amount, the control device 50 specifically calculates the minimum oxygen concentration and the minimum nitrogen dioxide concentration based on the chemical formula of the following formula (1).

[Chemical Formula 1]

$$C+NO_2+\tfrac{1}{2}O_2 \rightarrow CO_2+NO \qquad (1)$$

After step S20, the control device 50 executes step S30. In step S30, the control device 50 determines whether the oxygen concentration in the exhaust gas on the upstream side of the filter 32 is equal to or higher than the minimum oxygen concentration (minA) calculated in step S20 and the nitrogen dioxide concentration in the exhaust gas on the upstream side of the filter 32 is equal to or higher than the minimum nitrogen dioxide concentration (minB) calculated in step S20.

Specifically, in step S30, the control device 50 acquires the oxygen concentration in the exhaust gas on the upstream side of the filter 32 based on a detection result of the oxygen concentration sensor 41, and acquires the nitrogen dioxide concentration in the exhaust gas on the upstream side of the filter 32 based on a detection result of the nitrogen dioxide concentration sensor 42. Then, the control device 50 determines whether the oxygen concentration and the nitrogen dioxide concentration acquired in this way are equal to or higher than the minimum oxygen concentration and the minimum nitrogen dioxide concentration calculated in step S20, respectively.

However, a technique of acquiring the oxygen concentration and the nitrogen dioxide concentration by the control device 50 is not limited to the above technique. As another example, in a case where the internal combustion engine system 1 includes a lambda sensor for air-fuel ratio control or the like, the control device 50 can acquire the oxygen concentration in the exhaust gas on the upstream side of the filter 32 based on a detection value of the lambda sensor. Since the nitrogen dioxide concentration in the exhaust gas on the upstream side of the filter 32 is related to a combustion state of the internal combustion engine 10, the control device 50 can also acquire the nitrogen dioxide concentration in the exhaust gas on the upstream side of the filter 32 based on the combustion state of the internal combustion engine 10.

In a case where it is determined as NO in step S30, that is, in a case where the oxygen concentration in the exhaust gas on the upstream side of the filter 32 is smaller than the minimum oxygen concentration, or when the nitrogen dioxide concentration in the exhaust gas on the upstream side of the filter 32 is smaller than the minimum oxygen concentration, the control device 50 ends the execution of the flowchart.

On the other hand, in a case where it is determined as YES in step S30, the control device 50 controls the temperature of the exhaust gas flowing into the filter 32 within a temperature range in which the passive regeneration reaction of the C—$NO_2$—$O_2$ reaction occurs preferentially (hereinafter referred to as a predetermined temperature range) (step S40). In the embodiment, a temperature range of 250° C. or higher and 350° C. or lower is used as an example of the predetermined temperature range according to step S40. The predetermined temperature range is memorized in the memory unit (for example, ROM 52) in advance.

A specific example of a technique of controlling the exhaust gas temperature according to the step S40 is not particularly limited, but the control device 50 according to the embodiment controls the exhaust gas temperature in a predetermined temperature range by performing after-injection (fuel injection of injecting fuel into the cylinder 11 after main injection) as an example. Specifically, while monitoring the temperature of the exhaust gas flowing into the filter 32 based on a detection result of the temperature sensor 40, the control device 50 controls the injection amount and the like of the after-injection to control the temperature of the exhaust gas flowing into the filter 32 in a predetermined temperature range.

By executing the step S40, the passive regeneration reaction of the C—$NO_2$—$O_2$ reaction can be caused preferentially. Accordingly, the PM accumulated on the filter 32 can be removed by the passive regeneration reaction of the C—$NO_2$—$O_2$ reaction.

The control device 50 according to the embodiment executes step S40 for a predetermined period. A specific value of the period (predetermined period) for executing the step S40 is not particularly limited, and it is possible to use time for sufficiently removing PM by the passive regeneration reaction of for example, the C—$NO_2$—$O_2$ reaction. The predetermined period may be obtained in advance by an experiment such as simulation, and may be stored in the memory unit of the control device 50.

A specific example of the technique of controlling the exhaust gas temperature in step S40 is not limited to the control technique by the after-injection as described above. As another example, by changing opening/closing timing of an exhaust gas valve of the internal combustion engine 10 by a variable valve mechanism (not illustrated) of the internal combustion engine 10, the control device 50 can control the temperature of the exhaust gas discharged from the internal combustion engine 10 to control the temperature of the exhaust gas flowing into the filter 32 within a predetermined temperature range. Specifically, the exhaust gas temperature tends to rise as the opening/closing timing of the exhaust gas valve is retarded. Therefore, the control device 50 can control the temperature of the exhaust gas flowing into the filter 32 in a predetermined temperature range by controlling a retard amount of the opening/closing timing of the exhaust gas valve by the variable valve mechanism. After step S40, the control device 50 ends the execution of the flowchart.

The CPU 51 of the control device 50 executing step S20 corresponds to a member having a function as a calculation unit configured to calculate the minimum oxygen concentration and the minimum nitrogen dioxide concentration at which the passive regeneration reaction of the C—$NO_2$—$O_2$ reaction occurs based on the amount of the PM accumulated on the filter 32. The CPU 51 of the control device 50 executing step S40 corresponds to a member having a function as an exhaust gas temperature control unit configured to, in a case where the oxygen concentration and the nitrogen dioxide concentration in the exhaust gas on the upstream side of the filter 32 are equal to or higher than the minimum oxygen concentration and the minimum nitrogen dioxide concentration calculated in step S20, respectively, control the temperature of the exhaust gas flowing into the filter 32 within a temperature range in which the passive regeneration reaction of the C—$NO_2$—$O_2$ reaction occurs preferentially.

Although the filter regeneration system 100 according to the embodiment executes the filter regeneration processing by one control device 50, the configuration of the filter regeneration system 100 is not limited thereto. For example, the filter regeneration system 100 may perform the filter regeneration processing in a distributed manner by a plurality of control devices.

As described above, according to the filter regeneration system 100 and the filter regeneration method according to the embodiment, in a case where the oxygen concentration and the nitrogen dioxide concentration in the exhaust gas on the upstream side of the filter 32 are equal to or higher than the minimum oxygen concentration and the minimum nitrogen dioxide concentration calculated based on the amount of the PM accumulated on the filter 32 respectively at which the passive regeneration reaction of the C—$NO_2$—$O_2$ reaction occurs, the temperature of the exhaust gas flowing into the filter 32 can be controlled in a temperature range in which the passive regeneration reaction of the C—$NO_2$—$O_2$ reaction occurs preferentially. Accordingly, the PM accumulated on the filter 32 can be reliably removed by the passive regeneration reaction of the C—$NO_2$—$O_2$ reaction without performing wasteful control such as raising the temperature of the exhaust gas flowing into the filter 32 by the after-injection or the like, even though the oxygen concentration or the nitrogen dioxide concentration in the exhaust gas on the upstream side of the filter 32 is not a concentration at which the passive regeneration reaction of the C—$NO_2$—$O_2$ reaction occurs, for example. Therefore, the PM accumulated on the filter 32 can be efficiently removed by the passive regeneration reaction of the C—$NO_2$—$O_2$ reaction.

Further, according to the embodiment, since the PM accumulated on the filter 32 can be efficiently removed by the passive regeneration reaction of the C—$NO_2$—$O_2$ reaction as described above, it is possible to reduce execution frequency of the filter regeneration processing using the active regeneration reaction of the C—$O_2$ reaction. Further, according to the embodiment, since the execution frequency of the filter regeneration processing using the active regeneration reaction can be reduced as described above, as will be described hereinafter, fuel consumption of the internal combustion engine 10 can be improved.

Specifically, in FIG. 2, as described above, since the active regeneration reaction occurs at high temperature, it is necessary to raise the exhaust gas temperature to a high temperature at which the active regeneration reaction occurs in a case where the active regeneration reaction is to be executed. For example, a fuel is injected to the exhaust gas on the upstream side of the filter 32 by a fuel addition valve (not illustrated) arranged in a portion of the exhaust gas passage 20 on the upstream side of the filter 32, and it is necessary to bring the exhaust gas to a high temperature at which the active regeneration reaction occurs by combustion heat of the fuel. Therefore, as the execution frequency of the filter regeneration processing using the active regeneration reaction increases, the fuel consumption of the internal combustion engine 10 tends to deteriorate. In contrast, according to the embodiment, as described above, since PM can be efficiently removed by the passive regeneration reaction of the $C-NO_2-O_2$ reaction, it is possible to reduce the execution frequency of the filter regeneration processing using the active regeneration reaction, thereby reducing the fuel consumption of the internal combustion engine 10.

Although the preferred embodiments of the present disclosure have been described above, the present disclosure is not limited to such specific embodiments, and various deformations/modifications may be made within a scope of the summary of the present disclosure described in the claims.

This application is based on Japanese patent application No. 2016-111459 filed on Jun. 3, 2016, the contents of which are incorporated herein as reference.

INDUSTRIAL APPLICABILITY

The filter regeneration system for an internal combustion engine and the filter regeneration method for an internal combustion engine of the present disclosure are useful in that PM accumulated on a filter of an internal combustion engine can be efficiently removed by a passive regeneration reaction of a $C-NO_2-O_2$ reaction.

DESCRIPTION OF REFERENCE NUMERALS

1 internal combustion engine system
10 internal combustion engine
20 exhaust gas passage
30 exhaust gas purification device
32 filter
50 control device
51 CPU (calculation twit, exhaust gas temperature control unit)
100 filter regeneration system for internal combustion engine

The invention claimed is:

1. A filter regeneration system for an internal combustion engine, the filter regeneration system comprising:
 a memory configured to store instructions; and
 a central processing unit (CPU) coupled to the memory and configured to execute the instructions to:
  estimate an amount of PM (Particulate Matter) accumulated on a filter;
  calculate a minimum oxygen concentration and a minimum nitrogen dioxide concentration at which a passive regeneration reaction, in which carbon in the PM accumulated on the filter arranged in an exhaust gas passage of the internal combustion engine reacts with nitrogen dioxide and oxygen to generate carbon dioxide and nitrogen monoxide, occurs based on the estimated amount of the PM accumulated on the filter; and
  in a case where an oxygen concentration and a nitrogen dioxide concentration in exhaust gas on an upstream of the filter are equal to or higher than the minimum oxygen concentration and the minimum nitrogen dioxide concentration, respectively, control a temperature of exhaust gas flowing into the filter within a temperature range in which the passive regeneration reaction occurs preferentially.

2. The filter regeneration system of an internal combustion engine according to claim 1,
 wherein the temperature range is 250° C. or higher and 350° C. or lower.

3. A filter regeneration method for an internal combustion engine, the filter regeneration method comprising:
 a step of estimating an amount of PM (Particulate Matter) accumulated on a filter;
 a step of calculating a minimum oxygen concentration and a minimum nitrogen dioxide concentration at which a passive regeneration reaction, in which carbon in the PM accumulated on the filter arranged in an exhaust gas passage of the internal combustion engine reacts with nitrogen dioxide and oxygen to generate carbon dioxide and nitrogen monoxide, occurs based on the estimated amount of the PM accumulated on the filter; and
 a step of, in a case where an oxygen concentration and a nitrogen dioxide concentration in exhaust gas on an upstream of the filter are equal to or higher than the minimum oxygen concentration and the minimum nitrogen dioxide concentration, respectively, controlling a temperature of exhaust gas flowing into the filter within a temperature range in which the passive regeneration reaction occurs preferentially.

4. The filter regeneration method for an internal combustion engine according to claim 3,
 wherein the temperature range is 250° C. or higher and 350° C. or lower.

* * * * *